United States Patent
Halttunen et al.

(10) Patent No.: US 12,116,294 B2
(45) Date of Patent: Oct. 15, 2024

(54) TREATMENT SYSTEM COMPRISING WOOD-BASED ORGANIC MATERIAL AND ITS USE IN WASTEWATER TREATMENT, AND METHOD FOR REMOVING DISSOLVED ORGANIC COMPOUNDS FROM WASTEWATER

(71) Applicant: KEMIRA OYJ, Helsinki (FI)

(72) Inventors: Sakari Halttunen, Espoo (FI); Matias Penttinen, Espoo (FI); Jonni Ahlgren, Espoo (FI); Susann Härkönen, Espoo (FI); Marina Shestakova, Espoo (FI)

(73) Assignee: Kemira Oyj, Helsinki (FI)

( * ) Notice: Subject to any disclaimer, the term of this patent is extended or adjusted under 35 U.S.C. 154(b) by 514 days.

(21) Appl. No.: 17/618,815

(22) PCT Filed: Jun. 12, 2020

(86) PCT No.: PCT/FI2020/050419
§ 371 (c)(1),
(2) Date: Dec. 13, 2021

(87) PCT Pub. No.: WO2020/249871
PCT Pub. Date: Dec. 17, 2020

(65) Prior Publication Data
US 2022/0298035 A1    Sep. 22, 2022

(30) Foreign Application Priority Data

Jun. 14, 2019 (FI) ...................... 20195516

(51) Int. Cl.
*C02F 1/52* (2023.01)
*C02F 1/56* (2023.01)
(Continued)

(52) U.S. Cl.
CPC .............. *C02F 1/5245* (2013.01); *C02F 1/56* (2013.01); *C02F 1/66* (2013.01); *C02F 2103/28* (2013.01); *C02F 2209/08* (2013.01)

(58) Field of Classification Search
CPC .. C02F 1/5245; C02F 1/56; C02F 1/66; C02F 2103/28; C02F 2209/08; C02F 1/5263;
(Continued)

(56) References Cited

U.S. PATENT DOCUMENTS

| 3,462,275 A | 8/1969 | Bellamy |
| 2011/0094971 A1 | 4/2011 | Joh et al. |

(Continued)

FOREIGN PATENT DOCUMENTS

| CN | 109694113 A | 4/2019 |
| EP | 1108679 A2 | 6/2001 |

(Continued)

OTHER PUBLICATIONS

International Search Report and Written Opinion mailed Sep. 14, 2020 in PCT/FI2020/050419 (11 pages).
(Continued)

*Primary Examiner* — Waqaas Ali
(74) *Attorney, Agent, or Firm* — Meunier Carlin & Curfman LLC

(57) ABSTRACT

A treatment system for removing dissolved organic compounds from wastewater, which comprises a water-soluble cationic polymer, and wood-based organic material having an average particle size <10 mm. The invention relates also use of said treatment system for COD removal in the treatment of wastewaters, and a method for removing dissolved organic compounds from wastewater.

18 Claims, 4 Drawing Sheets

(51) Int. Cl.
*C02F 1/66* (2023.01)
*C02F 103/28* (2006.01)

(58) Field of Classification Search
CPC ....... C02F 1/5236; B03D 1/001; B03D 1/028; B03D 2201/002; B03D 1/1431; Y02W 10/10; B01J 20/0229; B01J 20/0248; B01J 20/24; B01J 20/261
See application file for complete search history.

(56) References Cited

U.S. PATENT DOCUMENTS

2012/0061321 A1  3/2012  Soane
2014/0061136 A1  3/2014  Schrand

FOREIGN PATENT DOCUMENTS

| EP | 1721869 A1 | | 11/2006 |
|---|---|---|---|
| GB | 1466473 A | | 3/1977 |
| GB | 2371296 A | * | 7/2002 |
| JP | 2012236160 A | | 12/2012 |

OTHER PUBLICATIONS

Finnish Search Report dated Jan. 14, 2020 in FI20195516 (2 pages).

* cited by examiner

TREATMENT SYSTEM COMPRISING WOOD-BASED ORGANIC MATERIAL AND ITS USE IN WASTEWATER TREATMENT, AND METHOD FOR REMOVING DISSOLVED ORGANIC COMPOUNDS FROM WASTEWATER

CROSS REFERENCE TO RELATED APPLICATIONS

This application is a United States National Phase Patent Application of International Patent Application Number PCT/FI2020/050419, filed on Jun. 12, 2020, claiming priority of Finnish national application number FI20195516 filed on Jun. 14, 2019, both of which are incorporated by reference herein in their entirety.

FIELD OF THE INVENTION

The present invention relates to a treatment system and its use for COD removal in the treatment of wastewaters originating from pulp and/or paper mill according to the independent claims presented below. The present invention also relates to a method for removing dissolved organic compounds from wastewater originating from pulp and/or paper mill.

BACKGROUND OF THE INVENTION

Pulp and paper production are one of the most water-intensive industrial processes generating huge amounts of highly contaminated wastewater per tonne of paper or board produced. Chemical oxygen demand (COD) in pulp and paper wastewaters can reach even up 40,000 mg/l. Conventionally, water treatment facilities of such effluents include primary clarifies, which remove total suspended solids and other particulate matter; biological treatment, which removes the majority of dissolved organic matter; secondary clarifiers for activated sludge separation; and tertiary treatment either in the form of coagulation-flocculation process with solid-liquid separation unit, or zonation, adsorption and others for biologically recalcitrant soluble organic compound, such as lignin, removal. Conventionally, coagulation with Al and Fe based inorganic metal salts or compounds is used in tertiary wastewater treatment for residual COD removal. Due to high volumes of produced wastewaters in pulp and paper industry, the treatment with inorganic metal salts generates high amounts of inorganic sludge during wastewater treatment. Landfilling is the common method for sludge disposal. Current landfills however reach their capacity quickly, and due to more strict environmental legislation it is difficult to build new ones. Therefore, there is a need to find new ways to reduce the volume of sludge for disposal. Many mills choose sludge incineration as a solution of the problem. However, it leads, in turn, to high amounts of ash formation, which need to be landfilled afterwards.

Moreover, the use of Al and Fe based inorganic metal salts in coagulation, pollutes the water with counter-ions, such as sulphate and chlorides that can cause scaling and corrosion in distribution systems, especially in the closed-loop ones, where accumulation effect of those ions is taking place.

There is a constant need to find novel solution for removal of biologically recalcitrant soluble organic compounds from pulp and paper mill wastewaters in the tertiary treatment facilities, which solutions meet environmental permits and safety levels and reduce ash content when incinerating the sludge.

SUMMARY OF THE INVENTION

It is an object of the present invention to reduce or even eliminate the above-mentioned problems appearing in prior art.

It is especially an object of the present invention to provide novel compositions for use in the treatment of wastewaters for COD removal that would reduce the inorganic metal coagulant load on the sludge formation in wastewater treatment facilities of pulp and paper mills, and further reduce the generation of ash during the combustion of sludge generated during wastewater treatment. A reduction of the ash production in sludge incineration is one of the objects.

In order to achieve among others the objects presented above, the invention is characterized by what is presented in the characterizing parts of the enclosed independent claims.

Some preferred embodiments of the invention will be described in the other claims.

The embodiments and advantages mentioned in this text relate, where applicable, both to the treatment system, the method as well as to the uses according to the invention, even though it is not always specifically mentioned.

Typical treatment system according to the present invention for the treatment of wastewater originating from pulp and/or paper mill comprises
- a water-soluble cationic polymer,
- Al and/or Fe based inorganic metal coagulant, and
- wood-based organic material having an average particle size <10 mm, wherein the treatment system comprises Al and/or Fe based inorganic metal coagulant and a combination of wood-based organic material and the cationic polymer in a weight ratio of 4:1-1:10. The treatment system according to the present invention is typically used in the treatment of wastewater, originating from pulp and/or paper mill, for efficient COD removal.

A typical method according to the invention for removing dissolved organic compounds from wastewater, preferably wastewater originating from pulp and/or paper mill, comprises
- obtaining wastewater from pulp and/or paper mill comprising organic dissolved compounds,
- adding a coagulant to wastewater to precipitate organic dissolved compounds,
- removing precipitated organic substances from the wastewater and forming organic sludge, wherein the coagulant comprises the treatment system according to the present invention.

It has been found that wood-based organic material in a form of powder, flakes, chips and/or other particles in combination with a cationic polymer is efficient in the coagulation and flocculation process for COD removal in the treatment of wastewater. Therefore, conventionally used Al and/or Fe based inorganic metal coagulants used in tertiary treatment of wastewater can be replaced partly with the treatment system comprising wood-based organic material and cationic polymer in order to provide treatment efficiency at least similar to conventional inorganic metal coagulants alone. According to the present invention, Al and/or Fe based inorganic metal coagulant dose can be reduced when they are used in combination with wood-based material and cationic polymer, e.g. Al and/or Fe based inorganic metal coagulant dose can be reduced around 50% while maintaining the efficacy of COD removal. By using cationic polymer and wood-based material, the effectiveness of coagulation with an active inorganic metal coagulant is enhanced and so a similar degree of COD removal may be achieved at a much lower total dose of inorganic metal coagulants or the COD removal may be improved at least 20% in compared to the addition of the inorganic metal coagulant alone.

According to an embodiment of the invention, the treatment system is designed to be used with solid-liquid separation system for removing biologically recalcitrant soluble organic compounds, such as lignin, from wastewater, i.e. so-called "hard COD". The treatment system according to the invention is especially suitable for use in tertiary wastewater treatment in pulp and/or paper mill, but the treatment system may also be dosed prior to primary and/or secondary clarifiers. The tertiary treatment may be a conventional coagulation-flocculation process with solid-liquid separation unit. Conventionally, coagulation with Al and/or Fe based inorganic metal salts or compounds is used in tertiary wastewater treatment for residual COD removal. According to the present invention, the use of cationic polymer and wood-based material in combination with the Al and/or Fe based inorganic metal coagulants for precipitation organic substances, such as lignin, reduces remarkably the addition amount of the Al and/or Fe based inorganic metal coagulants for achieving desired COD removal. Due to high volumes of produced wastewaters in pulp and paper industry, the reduced amount of the Al and/or Fe based inorganic metal coagulants also reduces the amounts of inorganic salts or compounds in the resulting sludge. Hence, the present invention enables biologically recalcitrant soluble organic compounds removal with minimized inorganic sludge production in wastewater treatment of pulp and/or paper mill wastewater.

The combination of cationic polymer and wood-based material has synergistic effects as the wood-based material functions as a coagulant and cationic polymer assist coagulation through attraction of suspended solids and formation of bigger flocs for faster precipitation. Bigger flocs can be easier and efficiently removed from the wastewater.

Further, it has been observed that the adjustment of wastewater pH before tertiary treatment may further improve COD removal. When adjusting the pH in the range of 3-6, preferably in the range of about 4-5, the same COD reduction may be obtained at inorganic metal coagulant doses even twice less as without pH adjustment.

The wood-based organic material(s) used in the present invention are highly available at pulp and paper mills, which makes them cost-effective product to use in the treatment of wastewaters at pulp and paper mill. The wood-based organic material may comprise wood flour, sawdust, wood dust, wood chips or flakes, wood bark, other wood-particles or the like. It is economically and logistically beneficial to use said wood-based organic materials in wastewater treatment process on site as at least partial replacement of Al and/or Fe based inorganic metal coagulants. Typically, they do not need any separate treating or handling before use, but they can be used as at the form they are available at pulp and paper mill. Also, the commercial wood-based material products comprising particles with average particle size <10 mm may also be used as the wood-based organic coagulant in the treatment system according to the present invention.

The treatment system according to the present invention does not remarkably affect the pH of the wastewater as the use of inorganic metal coagulants alone.

DESCRIPTION OF THE DRAWINGS

The invention will be described in more detail with reference to appended drawings, in which FIG. 1. shows COD removal efficiency when using iron sulphate coagulant Ferix-3 alone without (784 ppm point) and with pH adjustment (202-358 ppm points; pH=4), FIG. 2. shows soluble (filtered) COD removal efficiency when using iron sulphate coagulant Ferix-3 alone without (784 ppm point) and with pH adjustment (202-358 ppm points; pH=4), FIG. 3. shows UVabs$_{254\ nm}$ removal efficiency when using iron sulphate coagulant Ferix-3 alone without (784 ppm point) and with pH adjustment (202-358 ppm points; pH=4)

DETAILED DESCRIPTION OF THE INVENTION

Figure 1:
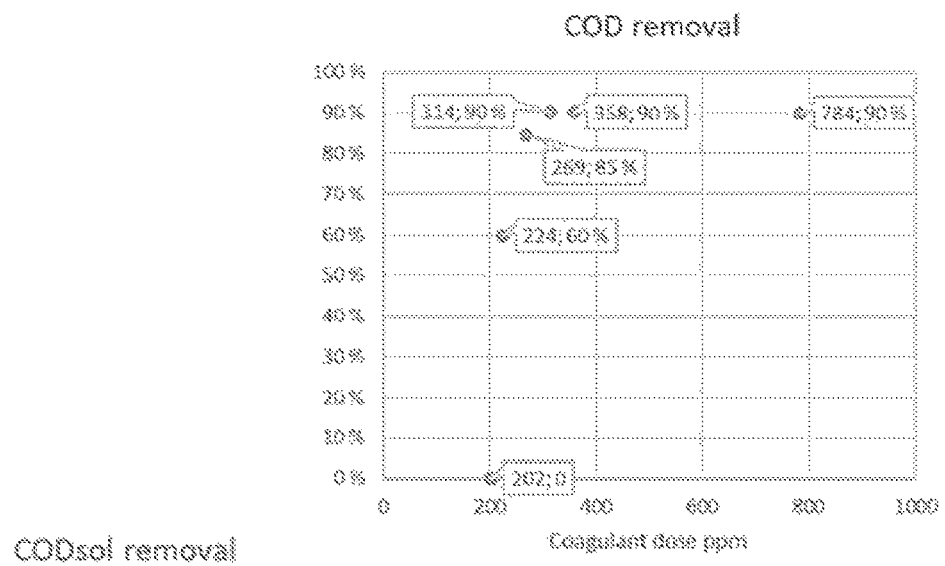

A treatment system or a treatment composition according to the present invention comprises at least wood-based organic material having an average particle size <10 mm and a water-soluble cationic polymer. Further, the treatment system according to the present invention comprises Al and/or Fe based inorganic metal coagulants in combination with wood-based organic material and cationic polymer, wherein wood-based organic material having an average particle size <10 mm and a water-soluble cationic polymer is used to replace partially conventional Al and/or Fe based inorganic metal coagulants in wastewater treatment.

In the present invention, the wood-based material acts as an adsorption surface and the cationic polymer in combination with Al and/or Fe based inorganic metal coagulant provides required charge to the treatment system for flocculation. Hence, the treatment system according to the present invention provides efficient precipitation of dissolved organic compounds.

According to the present invention, the wood-based organic material may be any wood-based material having an average particle size <10 mm. The average particle size refers to the average value of particle size distribution of the wood-based material. The wood-based organic material may be in a form of powder, flakes, chips, sticks and/or other particles. In an embodiment of the present invention, the particles of the wood-based organic material may be e.g. grounded or refined. According to one embodiment of the present invention, the wood-based material comprises saw dust, wood bark, mechanically grinded wood particles, wood flour, wood powder or any combination of them. The wood-based material may comprise coarse and/or fine particles. According to the present invention the average particle size of the wood-based material is <10 mm, preferably <5 mm for enabling coagulation and flocculation efficiency for precipitating organic dissolved compounds from wastewater. According to one embodiment of the present invention, the average particle size of the wood-based organic material is in the range of 0.010-10 mm, and preferably in the range of 0.050-5 mm. Smaller particle size of the wood-based material increases specific surface of the wood-based material, and so the improved performance can be seen even lower dosage amounts.

According to one embodiment of the present invention, the wood-based material may comprise sawdust or wood dust. Sawdust or wood dust is a common side stream waste material of wood products. Sawdust or wood dust is a typical by-product or waste product of woodworking operations such as sawing. It is mainly composed of fine particles of wood. Wood dust is a form of particulate matter or particles. Wood-based material may also be any other non-refined wood material in the form of particulates.

According to one embodiment of the present invention, the wood-based material may comprise wood bark. Wood bark is also a common side stream material from pulp and paper mills. Wood bark comprising bark flakes or chips, and/or bark mulch can be used in the treatment system according to the present invention. The particle size of bark-based material may vary. It can be used in the present invention without any further processing and/or it may be treated, e.g. grinded, to the smaller particulate matter prior to use in the treatment of wastewater.

According to one embodiment of the present invention, the wood-based material in a form of fine particles may be wood powder, wood flour or the like. Wood flour may be ligno-cellolosic adsorbent, which comprises softwood and/or hardwood micronized powder, also called as wood flour. According to one embodiment of the present invention wood flour/wood powder may comprise wood particles with 95% grain size <150 μm and 80% grain size >10 μm. According to one embodiment of the present invention, the wood-based material may be a blend of the finely divided wood powder/wood flour and the coarse particles, like wood and/or bark chips or other particulate matter and/or saw dust.

According to the present invention the wood-based material may be originated from any wood species. It may be softwood and/or hardwood based material.

According to one embodiment of the present invention, the treatment system comprises wood-based organic material and the cationic polymer in a weight ratio of 0.5:1-5:1, preferably 1:1-3:1, and more preferably 1:1-2:1, calculated by using active amount of the cationic polymer. The benefits in flocculation for COD removal can be reach even small amounts of the wood-based material, but the effect is improved by increasing the amount of the wood-based material in relation to cationic polymer. The suitable ratio is dependent on the wood-based material and its absorbent surface area and charge density of the cationic polymer.

The treatment system according to the present invention comprises at least one water-soluble cationic polymer for increasing flock size to be formed and for improving the separation of the precipitated organic substances from wastewater. For achieving improved flocculation, the cationic polymer has cationic net charge. According to an embodiment of the present invention, the cationic polymer comprises synthetic cationic polymer and/or bio-based cationic polymer. Water-solubility of the cationic polymer means that the cationic polymer is substantially water-soluble in an aqueous medium. The aqueous medium may e.g. comprise acid for achieving dissolution.

According to an embodiment of the present invention, the cationic polymer comprises polyamine, polyvinylamine, polyethyleneimine, polydicyandiamide (polyDCD), polydiallyldimethylammonium chloride (polyDADMAC), poly (acryloyloxyethyl trimethylammonium chloride) (poly-ADAM-Cl), poly (methacryloyloxyethyl trimethylammonium chloride) (polyMADAM-Cl), poly (acrylamido-N-propyltrimethylammonium chloride) (poly-APTAC), poly (methacrylamidopropyltrimethylammonium chloride) (polyMAPTAC) and/or a copolymer of (meth) acrylamide and cationic monomers selected from diallyl dimethylammonium chloride (DADMAC), acryloyloxyethyl trimethylammonium chloride (ADAM-Cl), methacryloyloxyethyl trimethylammonium chloride (MADAM-Cl), acrylamide-N-propyltrimethylammonium chloride (AP-TAC) and/or methacrylamidopropyltrimethylammonium chloride (MAPTAC). According to one preferred embodiment of the present invention, a cationic polymer comprises polyamine and/or polyDADMAC, preferably polyamine. Polyamines have typically higher cationicity as polyDADMAC and therefore polyamines provide same efficiency by smaller dosage as polyDADMAC.

Polyamines are organic compounds having two or more primary amino groups. PolyDADMAC is a homopolymer of diallyldimethylammonium chloride (DADMAC).

According to an embodiment of the present invention, a cationic polymer may comprise bio-based cationic polymer comprising cationic polysaccharide, such as starch, cellulose, guar gum, dextran or the like, and/or chitosan.

In an embodiment according to the present invention the cationic polymer comprises cationic starch having degree of substitution (DS) value at least 0.3, preferably at least 0.4 for providing required cationicity for flocculation. In the context of the present application the term "cationic starch" means starch which has been modified by cationisation.

Cationic starches, which have a degree of substitution, DS, >0.3 are considered high cationic starches in this application. The high cationic starch is preferably only slightly degraded or non-degraded and modified solely by cationisation. Most preferably the used starch is non-degraded and non-cross-linked. There are a number of derivatising agents which may be used to give a positive charge density to starch. A cationic starch may have quaternary ammonium, quaternary phosphonium, tertiary sulfonium, or other corresponding substituent(s). Particularly preferred is a cationic charge, which is derivatised to contain a quaternary ammonium ion, for example by etherification of hydroxyl groups with a suitable etherifying agent having a cationic character such as the methyl chloride quaternary salt of N-(2,3-epoxypropyl)dimethylamine or N-(2,3-epoxypropyl)dibutylamine or N-(2,3-epoxypropyl)methylaniline. Suitable high cationic starches are of natural origin, for example, potato, rice, corn, waxy corn, wheat, barley, sweet potato or tapioca starch, potato starch being preferred.

Cationicity of cationic starch may be defined by using degree of substitution (DS). Degree of substitution defines how many substituted groups are contained in cationic starch, calculated per one anhydroglucose unit of starch. Degree of substitution of cationic starch, which is cationised with 2,3-epoxypropyltrimethyl-ammonium chloride, is typically calculated by using the nitrogen content of pure dry cationic starch, which does not contain any other nitrogen sources than the quaternary ammonium groups. Nitrogen content is typically determined by using commonly known Kjeldahl-method. Degree of substitution of cationic starch, which is cationised with 2,3-epoxypropyltrimethylammonium chloride may be calculated by using the following equation:

$$DS=(162\times N\text{-}\%)/(1400-(N\text{-}\%\times 151.6)),$$

where 162 is the molecular weight of an anhydroglucose unit (AHG), N-% is the nitrogen value in %, 1400 is the molecular weight of nitrogen multiplied by 100 and 151.5 is the molecular weight of 2,3-epoxypropyltrimethylammonium chloride.

According to the present invention, wood-based organic material and cationic polymer is used in combination with Al and/or Fe based inorganic metal coagulant(s). The present invention enables decreasing the amount of the Al and/or Fe based inorganic metal coagulants used per kg of organic compounds in wastewater. According to one embodiment of the present invention, the treatment system comprises Al and/or Fe based inorganic metal coagulant and a combination of wood-based organic material and the cationic polymer in a weight ratio of 4:1-1:10, preferably 4:1-1:4 and more preferably 1:1-1:4, calculated by using active metal content and active amount of the cationic polymer. An improved COD removal efficacy, e.g. COD removal of even more than 80% is achieve which the decreased inorganic coagulant dosage in comparison to use of inorganic metal coagulants alone.

According to an embodiment of the present invention, the Al and/or Fe based inorganic metal coagulant comprises aluminium sulphate, polyaluminium chloride, iron sulphate, ferric chloride or any combination of them. According to an embodiment of the present invention, the treatment system may also comprise other multivalent compounds in addition to the Al and/or Fe based inorganic metal coagulant for improving the effect of the coagulants. According to an embodiment of the present invention, the multivalent compound may be zirconium, calcium and/or magnesium based compound.

In an embodiment according to the present invention, an addition of Al and/or Fe based inorganic metal coagulant may be carried out simultaneously with the addition of the wood-based organic material and cationic polymer, or they may be added sequentially to wastewater.

The treatment system according to the present invention is preferably used to remove biologically recalcitrant soluble organic substances, such as lignin from wastewaters, which removal can be observed as reduced COD. The treatment system according to the present invention is especially used in the treatment of wastewater originating from pulp and/or paper mill. The method according to the invention may be used for removing of the dissolved lignin e.g. from effluents from a bleaching of chemical pulp. Therefore, according to one preferred embodiment of the present invention the dissolved organic compounds to be precipitated from wastewater is understood as organic substances, such as lignin originating from pulp and/or paper making processes, e.g. from chemical pulping process of cellulosic fibre material. The organic compounds refer to e.g. lignin, lignin-like substances or compounds and their disintegration products as well as other organic compounds existing in wastewaters of pulp and paper processes. In the present context the term "recalcitrant soluble organic substances" is understood as organic substances or compounds that resist microbial degradation, are difficult to oxidize biochemically and/or are not readily biodegradable. Examples of such compounds are humic substances, such as wood-based lignin and its degradation products, large aromatic compounds and phenolic compounds, such as polyphenols.

A typical method according to the present invention for removing dissolved organic compound from wastewater, especially from wastewater originating from pulp and/or paper mill, comprises obtaining wastewater comprising organic dissolved compounds, adding the treatment system according to the present invention as a coagulant to wastewater to precipitate organic dissolved compounds, and removing precipitated organic substances from the wastewater and forming organic sludge.

The treatment system according to the present invention may be added to wastewater in any suitable point for removing dissolved organic compounds. The separation of the precipitated organic dissolved organic compounds can be carried out using any suitable solid-liquid separation system. Precipitated compounds can be separated from wastewater in primary clarifies, secondary clarifiers and/or in tertiary treatment after biological treatment.

According to an embodiment of the present invention, the treatment system is added to wastewater after biological treatment of wastewater, wherein especially recalcitrant organic soluble substances can be precipitated from wastewater.

In an embodiment of the present invention, the treatment system is added to wastewater after biological treatment of wastewater and prior to tertiary treatment, wherein the precipitated organic substances can be removed from wastewater in solid-liquid separation unit of the tertiary treatment. This application is especially valuable in the treatment of wastewater originating form pulp and/or paper mill. In an embodiment according to the present invention, at least part of the treatment system may also be added to the tertiary treatment. According to an embodiment of the present invention, the tertiary treatment comprises dissolved air flotation (DAF) step, wherein the treatment system of the present invention is preferably added to wastewater prior to conveying wastewater into DAF flotation tank. In an embodiment of the present invention, the treatment system can be dosed to the feed water of the DAF float tank to coagulate the colloidal particles and/or to conglomerate the particles into bigger clusters.

The precipitated solids may also be removed from the wastewater by using disk filter, settling tank or membrane filtration, wherein the treatment system is added prior separation step. The reject, i.e. an organic sludge, comprising the precipitated organic substances can be conveyed to incinerator. The sludge produced by the method according to the invention is highly organic and therefore the end disposal can be done with existing incinerators According to one embodiment of the present invention, pH of the wastewater is adjusted to be <7, preferably in the range of 3-6, and more preferably in the range of about 4-5 depending on the use inorganic metal coagulant. In a preferred embodiment according to the present invention, pH is adjusted prior to addition of the treatment system according to the present invention. The pH adjustment can be carried out by using conventional pH adjustment chemicals, such as $H_2SO_4$. It has been observed that COD removal with treatment system according to the present invention can be further improved with pH adjustment. The pH adjustment is especially used when the treatment system is dosed to the wastewater after biological treatment, wherein it does not affect detrimental to the operation of biological treatment.

The adequate amount of the components of the treatment system to be added is dependent on the wastewater to be treated.

EXPERIMENTAL

A better understanding of the present invention may be obtained through the following examples which are set worth to illustrate but are not to be construed as the limit of the present invention.

Flocculation Method and COD Analysis

The flocculation and coagulation experiments in the following Reference Example and Application Examples 1-5 are conducted using miniflocculator "Flocculator 2000". About 30 L amount of water is collected in order to be able to carry out all tests using same water sample. Water is stored in cold room before starting tests. The whole sample lot is homogenized, and 1 L samples are taken for the coagulation tests.

The sample is mixed (fast mixing 400 rpm 30 sec) and 0.1 M $H_2SO_4$ as pH-adjustment chemical and treatment chemical(s) specified in the following Examples are added to the sample. After treatment chemical additions mixing (slow mixing 40 rpm 10-20 min) is continued for floc formation and build-up. pH is measured at this stage. After mixing, the sample is stayed about 10-30 min for settling.

After settling samples are taken from the supernatant with pipette about 3 cm below the liquid level. The effect of the treatment chemical(s) on COD removal and UV absorbance reduction is determined. The chemical oxygen demand (COD) is used as an indicative measure of the amount of oxygen that can be consumed by reactions in a measured solution. It is commonly expressed in mass of oxygen consumed over volume of solution which in SI units is milligrams per litre (mg/L). A COD test can be used to easily quantify the amount of organic matter in water or wastewater. The most common application of COD is in quantifying the amount of oxidizable pollutants found in wastewater. COD samples are analysed using Hach Lange kit tubes and DR390 photometer. UV absorbance measurements at 254 nm are conducted using Unicam 5N024 spectrophotometer. The filtrated samples are taken by filtering the decanted supernatant. Filtration of samples prior to COD analysis is carried out with 0.45 μm prewashed cellulose acetate (CA) membrane filter.

EXAMPLES

Wastewater used in the following reference example and the application examples 1-5 originates bleached softwood kraft pulp manufacturing and the sample has been taken after biological treatment of wastewater. Organic dissolved compounds are precipitated as more detailed described in the following Examples.

Reference Example: COD Removal Efficiency from Wastewater when Using Iron Sulphate Coagulant Ferix-3 Alone The COD removal efficiency from wastewater when using iron sulphate coagulant Ferix-3 (Kemira Oyj) alone is shown in FIG. 1. FIG. 1. COD removal efficiency is tested by using Ferix-3 coagulant alone (784 ppm dosage of said product) without pH adjustment and with pH adjustment (202, 224, 269 314 and 358 ppm dosages of said product; pH=4). As is seen in FIG. 1, 90% of COD removal can be achieved without pH adjustment at the coagulant dose of 784 ppm. When adjusting the pH of wastewater till the value of 4, the same COD reduction can be obtained at Ferix-3 doses of 314 and 358 ppm, that is the dose of coagulant reduced more than twice. This means that amount of incinerated ash produced after wastewater sludge combustion is twice less when using pH adjustment in the wastewater treatment compared to the amount of sludge generated in the treatment of water without pH adjustment. Therefore, in order to obtain ash content reduction, experiments were conducted at a fixed pH equal to 4.

Figure 2:
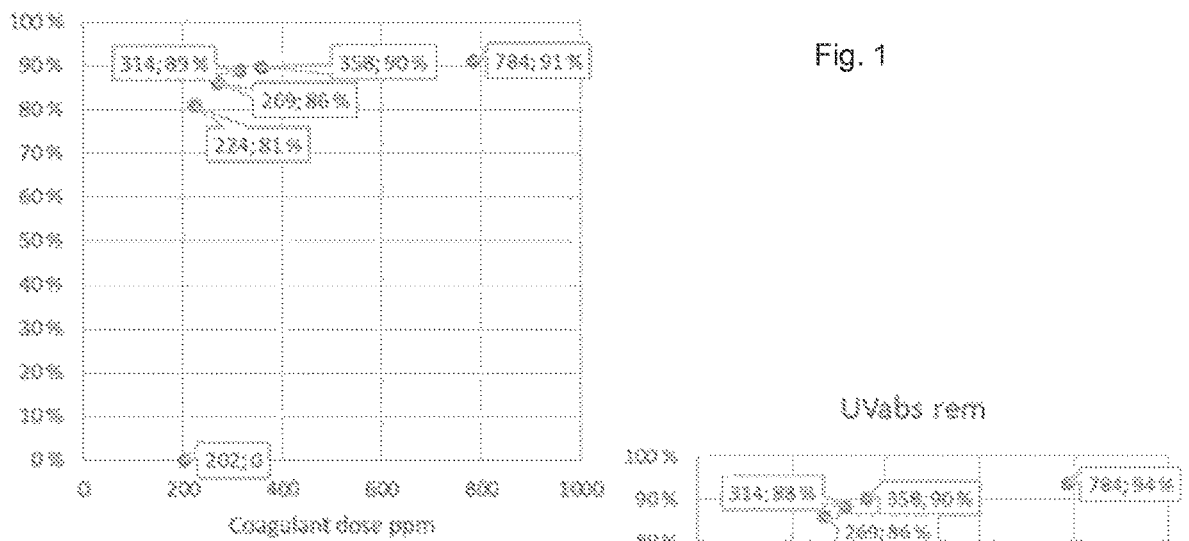
Figure 3:
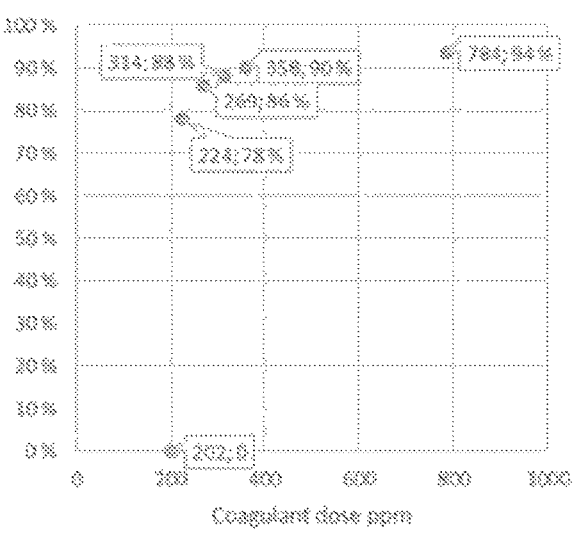

The similar trend is observed at the reduction values of soluble (filtered) COD and $UVabs_{254\ nm}$ as shown in FIGS. 2 and 3. Coagulant dose of 224 ppm and pH adjustment till 4 allows 60% of total COD reduction and about 80% of soluble COD and UV abs removal. pH 4 and Ferix-3 dose of 358 ppm allowed achieving about 90% filtered COD and UVabs removal versus 91% and 94 removal of filtered COD and UVabs respectively when 758 ppm of Ferix-3 were used without pH adjustment. As seen in FIGS. 1-3, coagulation with iron sulphate coagulant Ferix-3 alone at pH adjustment till 4, does not work at the iron doses below 200 ppm.

Application Example 1: Lignocellulosic Grounded Adsorbent and Cationic Polymer Flocculant Precipitation of organic dissolved compounds was conducted by using a blend of ligno-cellulosic adsorbent and cationic polyamine flocculant FennoFloc C50 either alone or in combination with iron sulphate coagulant Ferix-3 (Kemira Oyj), at pH=4.

Ligno-cellulosic grounded adsorbent comprises wood-based micronized powder (wood flour) with 95% grain size <150 μm and 80% grain size >10 μm (product code Vemissa E150, manufacturer SPPS, France). The dosage amounts presented in Figures are given as dosage of said product.

FennoFloc C50 (Kemira Oyj) is a polyamine with typical active polymer content 50% and typical Brookfield viscosity 500-1000 mPas at 25° C.

Figure 4:
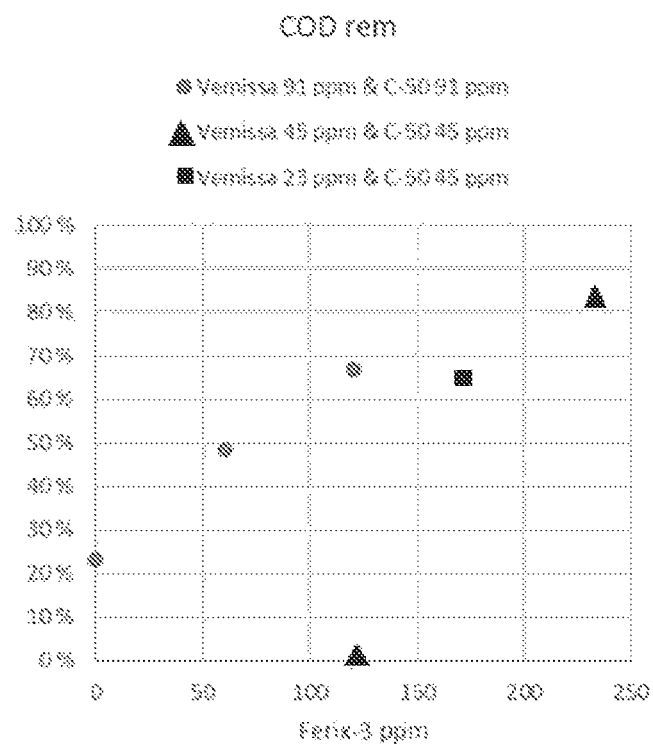
FIGS. 4 and 5 show COD and soluble COD removal efficiency from wastewater originating from bleached softwood kraft pulp manufacturing, by using a combination of iron sulphate coagulant Ferix-3 and Vemissa E150 surface adsorbent enhanced by cationic polyamine FennoFloc C50 with pH adjustment (pH=4)
Figure 5:
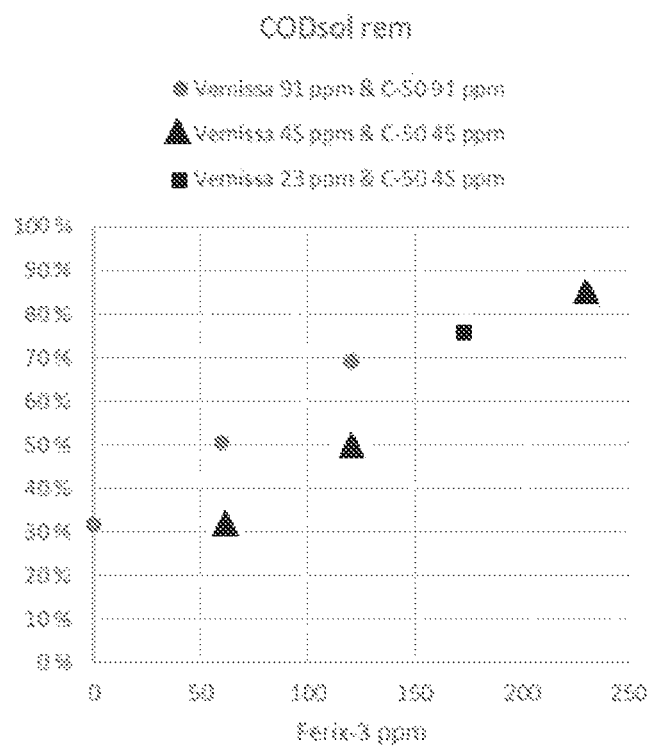

The COD and soluble (filtered) COD removal efficiency from wastewater using the combination of ligno-cellulosic adsorbent and cationic polyamine flocculant are shown in FIGS. 4 and 5. Cationic polyamine flocculant Fennofloc C50 (Figures referred as "C 50") can be used to assist coagulation through attraction of suspended solids and formation of bigger flocs for faster precipitation. The results of the tests showed that ligno-cellulosic adsorbent "Vemissa" can decrease the use of inorganic metal salt in wastewater treatment by precipitation. A blend of ligno-cellulosic adsorbent "Vemissa" and polyamine flocculant FennoFloc C50 can remove up to 30% of COD from wastewater, when used alone, and thus allowing to avoid inorganic sludge formation. When combined with iron sulphate coagulant Ferix-3, the maximum COD removal efficiency can reach more than 80%. This example shows that ligno-cellulosic adsorbent mixed with polyamine flocculant requires much smaller amounts of iron and aluminium salts for sufficient COD removal in coagulation process. In most cases, metal coagulant reduction of almost 50% was observed when conducting treatment process with a blend of ligno-cellulosic adsorbent and polyamine flocculant and while keeping removal efficiency at the same level.

FIG. 4 shows COD removal efficiency when assisting coagulation with ligno-cellulosic adsorbent mixed with cationic polyamine flocculant FennoFloc C50. Above 60% of total COD removal can be obtained at Ferix-3 coagulant dose of 224 ppm and pH 4. When using 230 ppm of Ferix-3 coagulant dose together with 45 ppm of organic ligno-cellulosic adsorbent mixed with 45 ppm of polyamine flocculant Fennofloc C50, more than 80% total COD reduction was obtained. As is seen in the FIG. 4, 67% COD reduction was observed when reducing Ferix-3 dose from 224 ppm to 120 ppm and using 91 ppm of ligno-cellulosic adsorbent mixed with 91 ppm of FennoFloc C50 flocculant. Filtered COD (FIG. 5) reduction showed the similar behaviour as total COD removal. Further decrease of metal coagulant dose requires increase of ligno-cellulosic adsorbent and polyamine flocculant dosages, to keep filtered COD removal efficiency at a sufficient level. For example, 70% soluble COD reduction requires metal coagulant dose of 120 ppm assisted with 91 ppm ligno-cellulosic_adsorbent, which is in turn mixed with 91 ppm polyamine flocculant Fenno-Floc C50. It is worth to notice that 91 ppm of ligno-cellulosic adsorbent in combination with 91 ppm of polyamine flocculant FennoFloc C50 used alone without metal coagulant at pH 4 allow removing about 20 of total COD and 30% of soluble COD from wastewater.

Application Example 2: Wood Bark and Cationic Polymer Flocculant

Precipitation of organic dissolved compounds was conducted by using a blend of pine bark material (average particle size <10 mm) and cationic polyamine flocculant FennoFloc C50 either alone or in combination with iron sulphate coagulant Ferix-3 (Kemira Oyj). The dosage amounts presented in Figures are given as dosage of said product.

FennoFloc C50 (Kemira Oyj) is a polyamine with typical active polymer content 50% and typical Brookfield viscosity 500-1000 mPas at 25° C.

Figure 6:
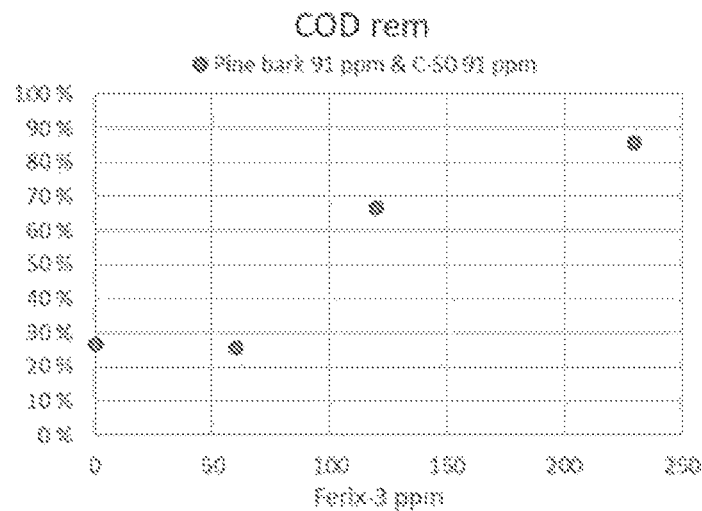
FIGS. 6-8 show COD, soluble COD and UVabs$_{254\ nm}$ removal efficiency from wastewater originating from bleached softwood kraft pulp manufacturing, by using a combination of iron sulphate coagulant Ferix-3 and pine bark surface adsorbent enhanced by cationic polyamine FennoFloc C50 with pH adjustment (pH=4)
Figure 7:
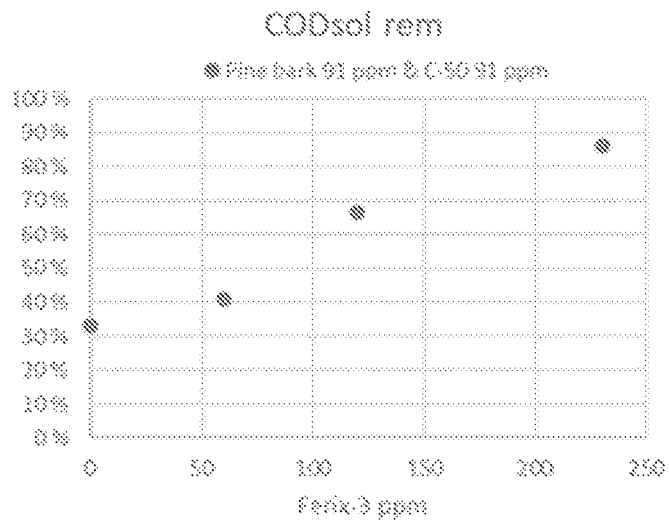
Figure 8:
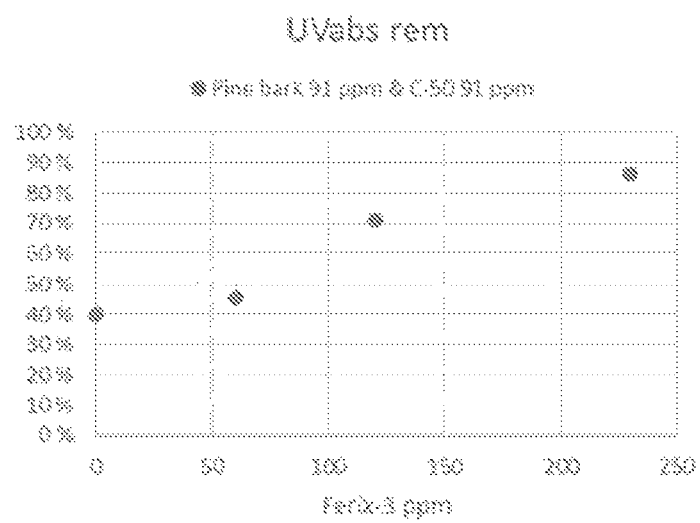

FIGS. 6-8 show the performance of pine bark material modified with cationic polyamine flocculant FennoFloc C50 in removal of COD, soluble COD and $UVabs_{254\ nm}$ values, at pH=4. When using iron sulphate coagulant Ferix-3 dose of 230 ppm and adding 91 ppm of pine bark adsorbent mixed with 91 ppm of polyamine flocculant, COD removal was improved more than by 20 and was equal to 85%. The smaller doses of Ferix-3 coagulant below 200 ppm combined with the blends of pine bark and polyamine flocculant allowed organic matter removal from wastewater, which was not observed when iron sulphate coagulant Ferix-3 has been used alone (see reference example). For example, when 120 ppm of Ferix-3 coagulant was dosed to wastewater together with the blend of pine bark and polyamine flocculant (91 ppm, ratio 1:1), 60-70% of COD and $UVabs_{254\ nm}$ removal were achieved. The use of pine bark-polyamine flocculant-blend alone (91 ppm, ratio 1:1) without inorganic metal coagulant, removes about 30% of COD and 40% of UVabs from wastewater.

Application Example 3: Saw Dust and Cationic Polymer Flocculant

Precipitation of organic dissolved compounds was conducted by using a blend of sawdust (average particle size <5 mm) and cationic polyamine flocculant FennoFloc C50 either alone or in combination with iron sulphate coagulant Ferix-3 (Kemira Oyj). The dosage amounts presented in Figures are given as dosage of said product.

FennoFloc C50 (Kemira Oyj) is a polyamine with typical active polymer content 50% and typical Brookfield viscosity 500-1000 mPas at 25° C.

Figure 9:
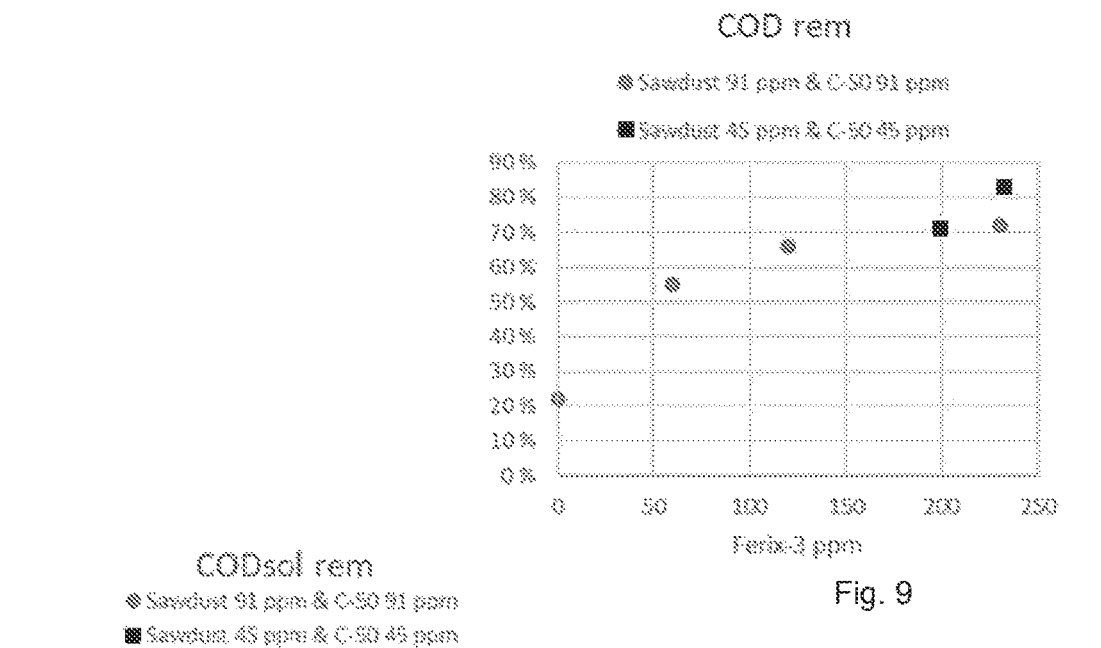
FIGS. 9-11 show COD, soluble COD and UVabs$_{254\ nm}$ removal efficiency from wastewater originating from bleached softwood kraft pulp manufacturing, by using a combination of iron sulphate coagulant Ferix-3 and saw dust surface adsorbent enhanced by cationic polyamine FennoFloc C50 with pH adjustment (pH=4).
Figure 10:
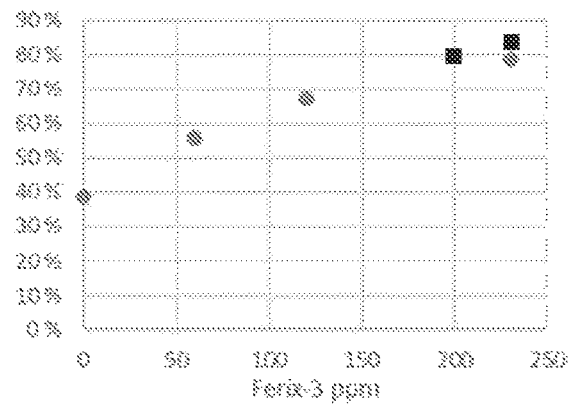
Figure 11:
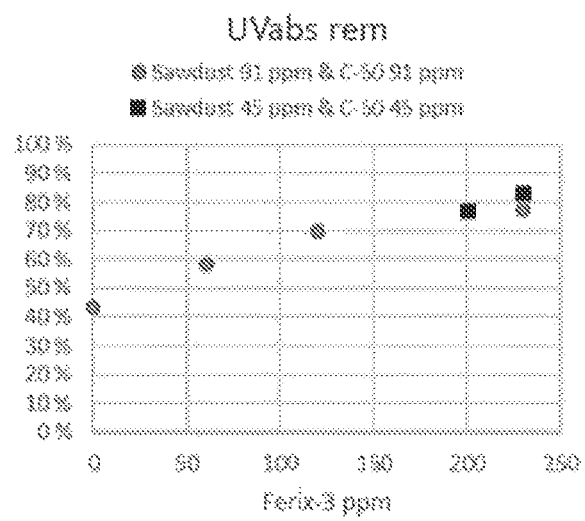

FIGS. 9-11 show the performance of sawdust material modified with FennoFloc C 50 polyamine flocculant in removal of COD, soluble COD and $UVabs_{254\ nm}$ values, at pH=4. When using iron sulphate coagulant Ferix-3 dose of 230 ppm and adding 45 ppm of sawdust adsorbent mixed with 45 ppm of polyamine flocculant, COD removal was improved by 20% and was equal to 80%, but there was no improvement in soluble COD and UVabs removal. However, the smaller doses of Ferix-3 coagulant below 200 ppm combined with the blends of sawdust and polyamine flocculant allowed organic compound removal from wastewater, which was not observed when Ferix-3 coagulant has been used alone. For example, when 120 ppm of iron sulphate coagulant Ferix-3 was dosed to wastewater together with sawdust-polyamine blend (91 ppm, ratio 1:1), 60-70% of COD and UVabs removal were achieved.

Application Example 4: Lignocellulosic Grounded Adsorbent and Cationic polyDADMAC Flocculant Precipitation of organic dissolved compounds was conducted by using a ligno-cellulosic adsorbent and cationic polyDADMAC flocculant FennoFloc C40 either alone or in combination with iron sulphate coagulant Ferix-3 (Kemira Oyj).

Ligno-cellulosic grounded adsorbent comprises wood-based micronized powder (wood flour) with 95% grain size <150 μm and 80% grain size >10 pm (product code Vemissa E150, manufacturer SPPS, France). The dosage amounts presented in Figures are given as dosage of said product.

FennoFloc C40 (Kemira Oyj) is a poly(diallyldimethyl-ammonium chloride) (polyDADMAC) with typical active polymer content 40% and typical Brookfield viscosity 1000-4000 mPas at 25° C.

Table 1 shows the performance of sawdust material modified with FennoFloc C40 polyDADMAC in removal of COD, soluble COD and $UVabs_{254\ nm}$ values, at pH=4 and 21° C.

TABLE 1

| Ferix-3 ppm | C40 ppm | Vemissa ppm | Turbidity NTU | Uvabs (254 nm) 1/cm | COD mg/l | COD filt (0.45 μm) mg/l |
| --- | --- | --- | --- | --- | --- | --- |
|  |  |  | 2.5 | 4.6 | 387 | 379 |
| 171 | 91 | 91 | 1.1 | 1.0 | 77 | 70.5 |
| 85 | 91 | 91 | 9.2 | 2.0 | 220 | 165 |
| 0 | 91 | 91 | 15 | 2.9 | 359 | 290 |

As shown in reference Example above, Ferix-3 dosages used in this experiment are ineffective for COD removal alone. A blend of the lignocellulosic adsorbent and the cationic flocculant provides efficient COD removal even small dosages of iron sulphate Ferix-3. Lignocellulosic adsorbent in combination with the cationic flocculant used alone without Ferix-3 addition reduces also COD from wastewater.

Application Example 5: Sawdust and Cationic Starch

Precipitation of organic dissolved compounds was conducted by using a blend of sawdust (average particle size <5 mm) and cationic starch flocculant in combination with iron sulphate coagulant Ferix-3 (Kemira Oyj). One test point was as in Application Example 3 using sawdust and cationic polyamine flocculant FennoFloc C50 in combination with Ferix-3.

Cationic starch used was dry powder of highly cationic starch with charge density 4.0 meq/g at pH 7.5 and Brookfield viscosity 471 mPas as 3% water solution at 25° C.

Table 2 shows the performance of sawdust material modified with cationic starch in removal of COD, soluble COD and $UVabs_{254\ nm}$ values, at pH=4 and 21° C. As shown in the results, COD can be efficient removed. COD removal around 90% can be achieved a combination of the sawdust and cationic starch with the reduced dosage of Ferix-3 compared to reference example.

TABLE 2

| Ferix-3 ppm | H$_2$SO$_4$ ppm | Sawdust ppm | Cationic starch ppm | C-50 ppm | Turbidity NTU | UVabs (254 nm) 1/cm | COD mg/l | COD filtered (0.45 μm) mg/l |
|---|---|---|---|---|---|---|---|---|
|  |  |  |  |  | 3.9 | 5.3 | 392 | 380 |
| 245 | 345 |  |  |  |  | No removal |  |  |
| 245 | 348 | 40 |  | 40 | 7.1 | 0.72 | 54 | 49 |
| 245 | 342 | 30 | 30 |  | 81 | 0.77 | 189 | 45 |
| 273 | 336 | 30 | 30 |  | 8.1 | 0.61 | 46 | 35 |
| 273 | 336 | 20 | 20 |  | 24 | 0.66 | 67 | 38 |

Conclusion of the Application Examples

The results of the application examples showed that wood-based organic material can decrease the amount of inorganic metal salt used in wastewater treatment. When used a blend of wood-based organic material and cationic polymer with iron sulphate coagulant Ferix-3, the maximum COD removal efficiency can reach more than 80%.

The invention claimed is:

1. A method to treat wastewater originating from pulp and/or paper mill, the method comprising:
   obtaining wastewater from the pulp and/or paper mill;
   providing a water-soluble synthetic cationic polymer and/or cationic bio-based polymer;
   providing wood-based organic material in a form of powder, flakes, chips, sticks and/or other particles having an average particle size <10 mm;
   preparing a blend of the wood-based organic material and the water-soluble synthetic cationic polymer and/or cationic bio-based polymer;
   providing an Al and/or Fe based inorganic metal coagulant;
   combining the Al and/or Fe based inorganic metal coagulant and the blend of the wood-based organic material and the water-soluble synthetic cationic polymer and/or cationic bio-based polymer in a weight ratio of 4:1-1:10; and
   adding into the wastewater the combined Al and/or Fe based inorganic metal coagulant and the blend of the wood-based organic material and the water-soluble synthetic cationic polymer and/or cationic bio-based polymer.

2. The method according to claim 1, wherein the wood-based organic material comprises saw dust, wood bark, mechanically grinded wood particles, wood flour, wood powder or any combination of them.

3. The method according to claim 1, wherein the average particle size of the wood-based organic material is <5 mm.

4. The method according to claim 1, wherein the average particle size of the wood-based organic material is in a range of 0.010-10 mm.

5. The method according to claim 1, wherein a weight ratio of the wood-based organic material and the synthetic cationic polymer and/or cationic bio-based polymer is 0.5:1-5:1, calculated by using active amount of the synthetic cationic polymer and/or cationic bio-based polymer, respectively.

6. The method according to claim 1, wherein a weight ratio of the Al and/or Fe based inorganic metal coagulant and the blend of wood-based organic material and the synthetic cationic polymer and/or cationic biobased polymer is 4:1-1:4, calculated by using active metal content and active amount of the synthetic cationic polymer and/or cationic biobased polymer.

7. The method according to claim 1, wherein the synthetic cationic polymer comprises polyamine, polyvinylamine, polyethyleneimine, polydicyandiamide (polyDCD), polydiallyldimethylammonium chloride (polyDADMAC), poly(acryloyloxyethyl trimethylammonium chloride) (polyADAM-Cl), poly (methacryloyloxyethyl trimethylammonium chloride) (polyMADAM-Cl), poly (acrylamido-N-propyltrimethylammonium chloride) (polyAPTAC), poly (methacrylamidopropyltrimethylammonium chloride) (polyMAPTAC) and/or a copolymer of (meth) acrylamide and cationic monomers selected from diallyl dimethylammonium chloride (DADMAC), acryloyloxyethyl trimethylammonium chloride (ADAM-Cl), methacryloyloxyethyltrimethylammonium chloride (MADAM-Cl), acrylamide-N-propyltrimethylammonium chloride (APTAC) and/or methacrylamidopropyltrimethylammonium chloride (MAPTAC).

8. The method according to claim 7, wherein the synthetic cationic polymer comprises polyamine and/or polydiallyldimethylammonium chloride (polyDADMAC).

9. The method according to claim 1, wherein the cationic bio-based polymer comprises cationic starch having degree of substitution (DS) value at least 0.3.

10. The method according to claim 1, wherein the Al and/or Fe based inorganic metal coagulant comprises aluminium sulphate, polyaluminium chloride, iron sulphate, ferric chloride or any combination of them.

11. The method according to claim 1, wherein the coagulant is added to wastewater after biological treatment step of the wastewater and prior to tertiary treatment.

12. The method according to claim 1, wherein pH of the wastewater is adjusted <7 prior to addition of the coagulant.

13. The method according to claim 3, wherein the average particle size of the wood-based organic material is in a range of 0.050-5 mm.

14. The method according to claim 5, wherein the weight ratio of the wood-based organic material and the synthetic cationic polymer and/or cationic bio-based polymer is 1:1-3:1 calculated by using active amount of the synthetic cationic polymer and/or cationic bio-based polymer, respectively.

15. The method according to claim 14, wherein the weight ratio of the wood-based organic material and the synthetic cationic polymer and/or cationic bio-based polymer is 1:1-2:1 calculated by using active amount of the synthetic cationic polymer and/or cationic bio-based polymer, respectively.

16. The method according to claim 6, wherein the weight ratio of the Al and/or Fe based inorganic metal coagulant and the blend of wood-based organic material and the synthetic cationic polymer and/or cationic biobased polymer is 1:1-1:4, calculated by using active metal content and active amount of the synthetic cationic polymer and/or cationic biobased polymer.

17. The method according to claim 9, wherein the cationic bio-based polymer comprises cationic starch having degree of substitution (DS) value at least 0.4.

18. The method according to claim 12, wherein pH of the wastewater is adjusted into a range of 3-6 prior to addition of the coagulant.

\* \* \* \* \*